US012173389B2

(12) United States Patent
Miura et al.

(10) Patent No.: US 12,173,389 B2
(45) Date of Patent: Dec. 24, 2024

(54) ALLOY POWDER FOR MAGNETIC MEMBER

(71) Applicant: Sanyo Special Steel Co., Ltd., Himeji (JP)

(72) Inventors: Kodai Miura, Himeji (JP); Toshiyuki Sawada, Himeji (JP); Ryohei Hosomi, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 629 days.

(21) Appl. No.: 17/441,441

(22) PCT Filed: Mar. 13, 2020

(86) PCT No.: PCT/JP2020/011175
§ 371 (c)(1),
(2) Date: Sep. 21, 2021

(87) PCT Pub. No.: WO2020/195968
PCT Pub. Date: Oct. 1, 2020

(65) Prior Publication Data

US 2022/0165464 A1 May 26, 2022

(30) Foreign Application Priority Data

Mar. 22, 2019 (JP) ................................ 2019-054273

(51) Int. Cl.

| | |
|---|---|
| ***C22C 38/10*** | (2006.01) |
| ***B22F 1/00*** | (2022.01) |
| ***B22F 1/068*** | (2022.01) |
| ***B22F 1/10*** | (2022.01) |
| ***B22F 1/142*** | (2022.01) |
| ***C22C 38/06*** | (2006.01) |
| ***C22C 38/16*** | (2006.01) |
| ***H01F 1/147*** | (2006.01) |

(52) U.S. Cl.
CPC .............. *C22C 38/105* (2013.01); *B22F 1/00* (2013.01); *B22F 1/068* (2022.01); *B22F 1/10* (2022.01); *B22F 1/142* (2022.01); *C22C 38/06* (2013.01); *C22C 38/16* (2013.01); *H01F 1/14733* (2013.01); *B22F 2301/35* (2013.01); *C22C 2202/02* (2013.01)

(58) Field of Classification Search
CPC ....... C22C 38/105; C22C 38/06; C22C 38/16; C22C 2202/02; B22F 1/068
See application file for complete search history.

(56) References Cited

U.S. PATENT DOCUMENTS

| | | | |
|---|---|---|---|
| 2017/0076845 A1 | 3/2017 | Suetsuna et al. |
| 2019/0206596 A1 | 7/2019 | Sawada et al. |
| 2019/0267169 A1 | 8/2019 | Sawada et al. |
| 2019/0351482 A1 | 11/2019 | Miura et al. |

FOREIGN PATENT DOCUMENTS

| | | |
|---|---|---|
| JP | H1022111 A | 1/1998 |
| JP | H10223420 A | 8/1998 |
| JP | 201870929 A | 5/2018 |
| JP | 201885438 A | 5/2018 |
| JP | 2018125480 A | 8/2018 |

OTHER PUBLICATIONS

English Abstract and English Machine Translation of Furuya (JP H1022111A) (Jan. 23, 1998).*
Zhao et al., "Broadcast and Television Secondary School Trial Teaching Materials: Audio and Video Recording Techniques", Broadcasting and Television Department Executive Director Education Office Publishing, 1985, pp. 145.

* cited by examiner

*Primary Examiner* — Jessee R Roe
(74) *Attorney, Agent, or Firm* — The Webb Law Firm

(57) ABSTRACT

Provided is an alloy powder capable of obtaining a magnetic member therefrom in which the frequency FR is extremely high. The powder for the magnetic member is composed of a plurality of flaky particles. These flaky particles are composed of an Fe-based alloy including: 6.5% by mass or more and 32.0% by mass or less of Ni; 6.0% by mass or more and 14.0% by mass or less of Al; 0% by mass or more and 17.0% by mass or less of Co; and 0% by mass or more and 7.0% by mass or less of Cu; the balance being Fe and unavoidable impurities. The average thickness Tav of this powder is 3.0 μm or less. The saturation magnetization Ms of this powder is 0.9 T or more. The coercive force iHc of this powder is 16 kA/m or more. This Fe-based alloy has a structure resulting from spinodal decomposition.

4 Claims, 1 Drawing Sheet

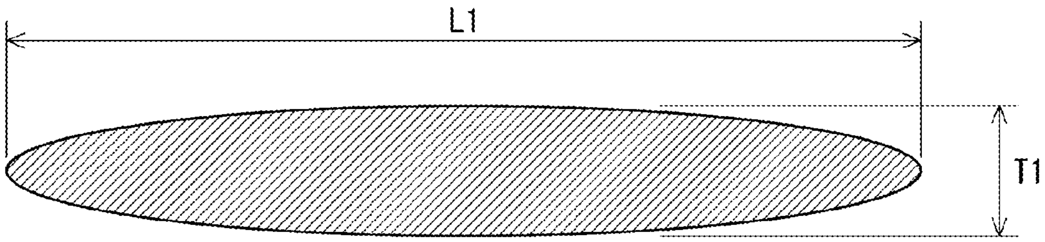
L1
T1

ALLOY POWDER FOR MAGNETIC MEMBER

CROSS-REFERENCE TO RELATED APPLICATIONS

This application is the United States national phase of International Application No. PCT/JP2020/011175 filed Mar. 13, 2020, and claims priority to Japanese Patent Application No. 2019-054273 filed Mar. 22, 2019, the disclosures of which are hereby incorporated by reference in their entirety.

BACKGROUND OF THE INVENTION

Field of the Invention

The present invention relates to an alloy powder for a magnetic member. Specifically, it relates to an alloy powder to be dispersed in the member of an electromagnetic wave absorption sheet etc.

Description of Related Art

Electronic devices such as personal computers, cellular phones, etc. have a circuit. Due to radio wave noises radiated from electronic components mounted on this circuit, there occurs radio wave interference among an electronic component and other electronic components, and among an electronic circuit and other electronic circuits. The radio wave interference causes malfunction of the electronic devices. For the purpose of suppressing the malfunction, electromagnetic wave absorption sheets are inserted in the electronic devices.

In information communications of recent years, a speed-up of a communication rate is attempted. For this high-speed communication, a high frequency radio wave is used. Thus, the electromagnetic wave absorption sheet suitable for use in the high frequency range has been desired.

An alloy powder capable of absorbing the high frequency radio wave has been proposed. Examples of this powder material include an Fe—Si—Al alloy, an Fe—Si alloy, an Fe—Cr alloy and an Fe—Cr—Si alloy.

In Patent Literature 1 (JP2018-125480A), described is a powder composed of flaky particles, wherein a material of the particles is an Fe-based alloy comprising C and Cr. This powder is suitable for use in the high frequency range.

In Patent Literature 2 (JP2018-70929A), described is a powder composed of flaky particles, wherein a material of the particles is an Fe-based alloy comprising C, Cr and N. This powder is suitable for use in the high frequency range.

In Patent Literature 3 (JP2018-85438A), described is a powder composed of particles, wherein a material of the particles is an Fe—Co-based alloy comprising C, Ni and Mn. This powder is suitable for use in the high frequency range.

CITATION LIST

Patent Literature

Patent Literature 1: JP2018-125480A
Patent Literature 2: JP2018-70929A
Patent Literature 3: JP2018-85438A

SUMMARY OF INVENTION

In the magnetic sheet including the powder composed of the Fe—Si—Al alloy, the Fe—Si alloy, the Fe—Cr alloy or the Fe—Cr—Si alloy, a frequency FR at which tan δ reaches 0.1 is in the range of several MHz to several tens MHz, wherein tan δ is represented by $\mu''/\mu'$, a ratio of an imaginary magnetic permeability $\mu''$ to a real magnetic permeability $\mu'$.

In the magnetic sheet including the powder described in Patent Literature 1 (JP2018-125480A), this frequency FR is at most 500 MHz. In the magnetic sheet including the powder described in Patent Literature 2 (JP2018-70929A), this frequency FR is also at most 500 MHz. In the magnetic sheet including the powder described in Patent Literature 3 (JP2018-85438A), this frequency FR is at most 960 MHz.

In the conventional powders capable of attaining a high frequency of FR, the size of martensite phases is controlled in a submicron order, while the size of precipitates of carbides etc. is controlled in a submicron order. Therefore, it is not easy to shift the frequency FR of the magnetic sheet to a higher frequency range.

An objective of the present invention is to provide an alloy powder capable of obtaining a magnetic member therefrom in which the frequency FR is extremely high.

The powder for the magnetic member according to the present invention is composed of a plurality of (or numerous) flaky particles. These particles are composed of an Fe-based alloy comprising: 6.5% by mass or more and 32.0% by mass or less of Ni; 6.0% by mass or more and 14.0% by mass or less of Al; 0% by mass or more and 17.0% by mass or less of Co; and 0% by mass or more and 7.0% by mass or less of Cu; with the balance being Fe and unavoidable impurities. This powder has an average thickness Tav of 3.0 μm or less.

Preferably, this powder has a saturation magnetization Ms of 0.9 T or more.

Preferably, this powder has a coercive force iHc of 16 kA/m or more.

Preferably, the Fe-based alloy has a structure resulting from spinodal decomposition.

From another point of view, a polymer composition for a magnetic member according to the present invention comprises a base polymer and a powder dispersed in the base polymer. This powder is composed of a plurality of (or numerous) flaky particles. These particles are composed of an Fe-based alloy comprising: 6.5% by mass or more and 32.0% by mass or less of Ni; 6.0% by mass or more and 14.0% by mass or less of Al; 0% by mass or more and 17.0% by mass or less of Co; and 0% by mass or more and 7.0% by mass or less of Cu; with the balance being Fe and unavoidable impurities.

In the magnetic member using the powder according to the present invention, extremely high frequency of FR can be attained.

BRIEF DESCRIPTION OF THE DRAWING

FIG. 1 is a schematic sectional FIGURE showing a particle of the powder with respect to one embodiment of the present invention.

DESCRIPTION OF THE INVENTION

Hereinafter, the present invention will be described in detail based on preferred embodiments with reference to the drawing as appropriate.

[Particle Shape]

The powder according to the present invention is a set of a plurality of (or numerous) particles. In FIG. 1, a section of one particle is shown. In FIG. 1, what is shown as a reference sign L1 is a length of a major axis of the particle;

and what is shown as a reference sign T1 is a thickness of the particle. The length L1 is larger than the thickness T1. In other words, this particle is flaky.

The flaky particle has in-plane shape anisotropy. This anisotropy enhances the real magnetic permeability μ' of the magnetic member. Moreover, in the magnetic member containing particles having a small thickness of T1, eddy current loss is suppressed, so that the real magnetic permeability μ' is unlikely to be relaxed. In this magnetic member, the frequency FR at which tan δ reaches 0.1 is high, wherein tan δ is represented by μ"/μ', the ratio of the imaginary magnetic permeability μ" to the real magnetic permeability μ'. In this magnetic member, the frequency FR of 70 MHz or more can be attained.

An average Tav of the thickness T1 is preferably 3.0 μm or less. In the magnetic member containing the powder having the average thickness Tav of 3.0 μm or less, the eddy current loss is suppressed. The frequency FR of this magnetic member is high. From this point of view, the average thickness Tav is more preferably 2.5 μm or less, and particularly preferably 2.0 μm or less. From a point of view of easy powder production, the average thickness Tav is preferably 0.1 μm or more, more preferably 0.5 μm or more, and particularly preferably 1.0 μm or more.

An aspect ratio of this powder is preferably 1.5 or more and 100 or less. In the magnetic member using the powder having an aspect ratio of 1.5 or more, the real magnetic permeability μ' and the imaginary magnetic permeability μ" in the high frequency range are sufficiently large. From this point of view, it is particularly preferable that the aspect ratio is 5 or more. In the magnetic member using the powder having an aspect ratio of 100 or less, a number of contact points where the particles come into contact one another is reduced, resulting in suppressing the eddy current loss. From this point of view, it is particularly preferable that the aspect ratio is 80 or less.

For measurements of the length L1, the thickness T2 and the aspect ratio, used is a resin embedded sample where the thickness direction of the flaky powder can be observed. This sample is polished, and the polished surface is observed by using a scanning electron microscope (SEM). A magnification of the image at the observation is 500 times. In analysis of this image, the image data is binarized. When the binarized image is approximated to an ellipse, the major axis length is the length L1; the minor axis length is the thickness T1; and the ratio of the two (the major axis length/the minor axis length) is the aspect ratio of each particle. These results are arithmetically averaged, and the average thickness Tav and the aspect ratio of the powder are calculated.

[Composition]

The material of the particles is an Fe-based alloy. This alloy comprises:

Ni: 6.5% by mass or more and 32% by mass or less;
Al: 6% by mass or more and 14% by mass or less;
Co: 0% by mass or more and 17% by mass or less; and
Cu: 0% by mass or more and 7% by mass or less;
the balance being Fe and unavoidable impurities.

Preferable composition of this Fe-based alloy consists of:

Ni: 6.5% by mass or more and 32% by mass or less;
Al: 6% by mass or more and 14% by mass or less;
Co: 0% by mass or more and 17% by mass or less;
Cu: 0% by mass or more and 7% by mass or less; and
the balance being Fe and unavoidable impurities.

The structure of the alloy at the stage of not aged is a supersaturated solid solution of the martensite phase. When this alloy is subjected to the aging treatment, the phase is decomposed to a ferromagnetic phase α1 rich in Fe and a weakly magnetic phase α2 containing Ni and Al. This decomposition is called as spinodal decomposition. The structure after the spinodal decomposition has a periodic modulated structure. A period of this structure is in a nano order. The period of this structure is smaller than that of precipitation-type structure. The powder having this structure has a high coercive force. The frequency FR of the magnetic member containing this powder is high.

When the particles are flattened, stress is applied to the structure. When the spinodal decomposition is occurred in the state that the stress is applied, a large magnetoelastic effect is attained due to the stress applying to the ferromagnetic phase α1. In the magnetic member containing this powder, a high frequency of FR can be attained.

[Ni]

Ni forms a martensite phase of Fe—Ni. Ni is essential to formation of the weakly magnetic phase α2. With the alloy containing Ni, the powder having a high coercive force can be obtained. From this point of view, a content ratio of Ni is preferably 6.5% by mass or more, more preferably 7.2% by mass or more, and particularly preferably 7.5% by mass or more. An excess Ni content invites residual austenite after aging. The residual austenite reduces the saturation magnetization, thereby decreasing the frequency FR. From this point of view, the content ratio of Ni is preferably 32.0% by mass or less, more preferably 30.0% by mass or less, and particularly preferably 27.4% by mass or less.

[Al]

Al is essential to formation of the weakly magnetic phase α2. Al increases a specific resistance of the particles, thereby reducing the eddy current loss. From this point of view, a content ratio of Al is preferably 6.0% by mass or more, more preferably 6.8% by mass or more, and particularly preferably 7.0% by mass or more. An excess Al content reduces the saturation magnetization, thereby decreasing the frequency FR. From this point of view, the content ratio of Al is preferably 14.0% by mass or less, more preferably 12.0% by mass or less, and particularly preferably 11.5% by mass or less.

[Co]

Co can be solid-dissolved into the ferromagnetic phase α1 and the weakly magnetic phase α2. The solid solution of Co in the ferromagnetic phase α1 leads to the formation of the ferromagnetic phase of Fe—Co in accordance with so-called Slater-Pauling rule. The saturation magnetization of this ferromagnetic phase is high. The saturation magnetization of the weakly magnetic phase α2 with solid-dissolved Co is low. The coercive force of the powder after the spinodal decomposition is proportional to the square of the difference between the saturation magnetization of the ferromagnetic phase α1 and the saturation magnetization of the weakly magnetic phase α2. The coercive force of the powder composed of the ferromagnetic phase α1 and the weakly magnetic phase α2 with solid-dissolved Co is large. With this powder, the magnetic member having a high frequency of FR can be obtained.

From this point of view, a content ratio of Co is preferably 2.0% by mass or more, more preferably 4.0% by mass or more, and particularly preferably 5.7% by mass or more. Co is expensive. From a point of view of lower costs of the magnetic member, the content ratio of Co is preferably 17.0% by mass or less. In the present invention, Co is not essential. Therefore, the alloy may not contain Co except an unavoidable impurity. In other words, the content ratio of Co may be substantially zero.

[Cu]

Cu is solid-dissolved principally into the weakly magnetic phase α2. The saturation magnetization of the weakly magnetic phase α2 with solid-dissolved Cu is low. In the alloy containing Cu, the difference between the saturation magnetization of the ferromagnetic phase α1 and the saturation magnetization of the weakly magnetic phase α2 is large. The coercive force of this powder is large. With this powder, the magnetic member having a high frequency of FR can be obtained. Cu further promotes diffusion of elements of the weakly magnetic phase α2. Thus, in the aging treatment of the alloy containing Cu, a heating time is short enough. From these points of view, a content ratio of Cu is preferably 0.5% by mass or more, more preferably 1.2% by mass or more, and particularly preferably 3.0% by mass or more. An excess Cu content invites the residual austenite after the aging. The residual austenite reduces the saturation magnetization, thereby decreasing the frequency FR. From this point of view, the content ratio of Cu is preferably 7.0% by mass or less, more preferably 6.0% by mass or less, and particularly preferably 5.8% by mass or less. In the present invention, Cu is not essential. Thus, the alloy may not contain Cu except an unavoidable impurity. In other words, the content ratio of Cu may be substantially zero.

[Saturation Magnetization Ms]

In the magnetic member containing the powder having the large saturation magnetization Ms, the frequency FR is high. From this point of view, the saturation magnetization Ms of the powder is preferably 0.9 T or more, more preferably 1.0 T or more, and particularly preferably 1.1 T or more. It is preferable that the saturation magnetization Ms is 2.0 T or less.

The saturation magnetization Ms is measured by using a vibrating sample magnetometer (VSM). Measurement conditions are as follows.

Maximum applied magnetic field: 1204 kA/m

Mass of powder: around 70 mg

[Coercive Force iHc]

In the magnetic member containing the powder having a large coercive force iHc, the frequency FR is high. From this point of view, the coercive force iHc of the powder is preferably 16 kA/m or more, more preferably 18 kA/m or more, and particularly preferably 20 kA/m or more. It is preferable that the coercive force iHc is 50 kA/m or less.

The coercive force iHc is an intensity of the external magnetic field required for returning the magnetized magnetic body to the unmagnetized state. The coercive force is measured by using the vibrating sample magnetometer (VSM). Measurement conditions are the same as those of the saturation magnetization Ms. A direction of the magnetic field applied is a longitudinal direction of the flaky particle.

[Median Diameter D50]

From a point of view that the magnetic member that is homogeneous and has a smooth surface can be obtained, a median diameter D50 of the powder is preferably 90 μm or less, more preferably 80 μm or less, and particularly preferably 70 μm or less. It is preferable that the median diameter D50 is 10 μm or more.

The median diameter D50 is a particle diameter at a point where a cumulative curve is 50% when the cumulative curve is obtained with the total volume of the powder as 100%. The median diameter D50 is measured by using a laser diffraction/scattering type particle diameter distribution measuring device, e.g., Microtrack MT-3000, available from Nikkiso Co., Ltd. Into a cell of this device, the powder is flowed together with pure water, and based on optical scattering information of the particles, a median diameter D50 is detected.

[Tap Density TD]

From a point of view that the magnetic member that is homogeneous and has a smooth surface can be obtained, a tap density TD of the powder is preferably 1.7 g/cm$^3$ or less, more preferably 1.5 g/cm$^3$ or less, and particularly preferably 1.3 g/cm$^3$ or less. It is preferable that the tap density TD is 0.3 g/cm$^3$ or more.

The tap density TD is measured in accordance with provisions of JIS Z 2512. In the measurements, the powder of around 40 g is filled in a cylinder of which an internal volume is 100 cm$^3$. Measurement conditions are as follows.

Falling height: 50 mm a number of tapping: 200

[Production of Powder]

The powder according to the present invention is obtained by flattening a raw material powder. The raw material powder can be obtained by a gas atomizing method, a water atomizing method, a disc atomizing method, a pulverizing method, etc. Preferable are the gas atomizing method and the disc atomizing method.

In the gas atomizing method, the raw metal is heated to melt, obtaining molten metal. This molten metal is flowed out of a nozzle. To this molten metal, a gas (an argon gas, a nitrogen gas, etc.) is sprayed. By means of energy of this gas, the molten metal is pulverized to liquid drops, and cooling while they are falling. These liquid drops are solidified to form particles. In this gas atomizing method, since the molten metal is instantaneously changed to the liquid drops and cooled at the same time, a homogeneous microstructure is obtained. Moreover, since the liquid drops are continuously formed, composition differences among the particles are extremely small.

In the disc atomizing method, the raw metal is heated to melt, obtaining molten metal. This molten metal is flowed out of a nozzle. This molten metal is dropped on a disc rotated with a high speed. The molten metal is rapidly cooled to solidify, thereby obtaining particles.

This raw material powder is subjected to classification and heat treatment as needed. That raw material powder is subjected to flattening. Typical flattening is conducted by using an attritor. The powder after the flattening is subjected to the processing of the heat treatment, the classification, etc. as needed.

[Heat Treatment of Powder]

In the present invention, it is preferable that the powder is subjected to the aging treatment. By the aging treatment, the powder having a high coercive force is obtained. This aging treatment may be conducted for the powder before the flattening or for the powder after the flattening. The powder before the flattening may be subjected to the aging treatment and the powder after the flattening may further be subjected to the aging treatment. A temperature of the aging treatment is preferably 500° C. or more and 800° C. or less, and particularly preferably 550° C. or more and 750° C. or less.

An aging treatment time is preferably 1 hour or more and 6 hours or less, and particularly preferably 1 hour or more and 5 hours or less.

[Molding of Magnetic Member]

To obtaining the magnetic member from this powder, first, the powder is kneaded in a base polymer such as resin and rubber, to obtain a polymer composition. For kneading, a known method can be employed. The kneading is conducted by using, e.g., a sealed type kneading machine, an open roll, etc.

Next, the magnetic member is molded from this polymer composition. For molding, a known method can be employed. The molding is conducted by using a compression molding method, an injection molding method, an extrusion molding method, a rolling molding method, etc. A typical shape of the magnetic member is a sheet shape. Shapes of a ring, a cubic, a rectangular parallelepiped, a cylindrical, etc. can be employed for the magnetic member. The magnetic member containing the powder according to the present invention is particularly suitable for use in a frequency range of 700 MHz or more.

In the base polymer, various agents can be kneaded with the powder. Examples of the agents include processing aids such as lubricants and binders. The polymer composition may contain flame retardant.

[Polymer Composition]

The polymer composition for the magnetic member according to the present invention comprises a base polymer and a powder dispersed in this base polymer. The powder is composed of a plurality of (or numerous) flaky particles. These flaky particles are composed of an Fe-based alloy comprising: 6.5% by mass or more and 32.0% by mass or less of Ni; 6.0% by mass or more and 14.0% by mass or less of Al; 0% by mass or more and 17.0% by mass or less of Co; and 0% by mass or more and 7.0% by mass or less of Cu; with the balance being Fe and unavoidable impurities. A content of the powder in this polymer composition is preferably 3 parts by mass or more and 70 parts by mass or less, with respect to 100 parts by mass of the base polymer.

[Magnetic Member]

The magnetic member according to the present invention is composed of the polymer composition. This polymer composition comprises the base polymer and the powder dispersed in this base polymer. The powder is composed of a plurality of (or numerous) flaky particles. These flaky particles are composed of the Fe-based alloy comprising: 6.5% by mass or more and 32.0% by mass or less of Ni; 6.0% by mass or more and 14.0% by mass or less of Al; 0% by mass or more and 17.0% by mass or less of Co; and 0% by mass or more and 7.0% by mass or less of Cu; with the balance being Fe and unavoidable impurities. The content of the powder in this polymer composition is preferably 3 parts by mass or more and 70 parts by mass or less, with respect to 100 parts by mass of the base polymer.

EXAMPLES

Hereinafter, the effects of the present invention will be clarified by the examples, but the examples should not be construed to limit the scope of the present invention.

Example 1

The raw material powder was obtained by the gas atomization and the classification. This raw material powder was subjected to the flattening by a wet type attritor. Further, this powder was subjected to the aging treatment, to prepare the powder of Example 1 having a composition shown in Table 1 below. The aging treatment caused the spinodal decomposition to form the ferromagnetic phase α1 and the weakly magnetic phase α2. The median diameter D50, the tap density TD, the average thickness Tav, the saturation magnetization Ms, and the coercive force iHc, of this powder, are shown in Table 1 below.

Examples 2 to 6 and Comparative Examples 1 to 6

Each powder of Examples 2 to 6 and Comparative Examples 1 to 6 was prepared in the same manner as Example 1, except that each composition was that shown in Table 1 below.

[Frequency FR]

The powder of 20 parts by mass was kneaded with the base resin of 100 parts by mass, to obtain a resin composition. This resin composition was used to form a sheet for the magnetic member. From this magnetic sheet, a strip-shaped specimen of a width of 4 mm and a length of 35 mm was cut out. Using this specimen, the relative magnetic permeability in the range of 1 MHz to 9 GHz at room temperature was measured by PMM-9G1 (manufactured by Ryowa Electronics Co., Ltd.), to calculate FR. The results are shown in Table 1 below.

TABLE 1

Table 1 Evaluation Results

| | Composition (% by mass) | | | | D50 | TD | Tav | Ms | iHc | FR |
|---|---|---|---|---|---|---|---|---|---|---|
| | Ni | Al | Co | Cu | μm | g/cm³ | μm | T | kA/m | MHz |
| Ex. 1 | 21.0 | 10.5 | 0.0 | 0.0 | 67 | 0.8 | 1.8 | 1.25 | 19.6 | 814 |
| Ex. 2 | 18.2 | 11.1 | 13.6 | 5.8 | 43 | 0.9 | 2.3 | 1.15 | 24.2 | 952 |
| Ex. 3 | 26.2 | 11.7 | 0.0 | 0.0 | 69 | 0.7 | 1.5 | 1.10 | 21.9 | 883 |
| Ex. 4 | 27.4 | 11.5 | 5.7 | 0.0 | 86 | 0.7 | 1.6 | 1.01 | 31.1 | 1160 |
| Ex. 5 | 14.3 | 8.3 | 14.2 | 3.2 | 58 | 0.6 | 1.6 | 1.33 | 29.7 | 1240 |
| Ex. 6 | 7.2 | 6.8 | 16.9 | 1.2 | 39 | 0.8 | 0.9 | 1.72 | 27.6 | 1056 |
| Comp. Ex. 1 | 24.0 | 13.6 | 6.0 | 0.0 | 35 | 0.9 | 4.5 | 1.12 | 20.1 | 571 |
| Comp. Ex. 2 | 4.0 | 6.1 | 10.0 | 1.1 | 92 | 0.7 | 1.8 | 1.43 | 0.7 | 242 |
| Comp. Ex. 3 | 38.0 | 11.2 | 2.0 | 2.0 | 74 | 0.9 | 1.5 | 0.65 | 9.5 | 510 |
| Comp. Ex. 4 | 22.1 | 2.1 | 3.4 | 1.2 | 86 | 0.7 | 1.3 | 1.45 | 3.0 | 312 |
| Comp. Ex. 5 | 24.2 | 15.8 | 0.0 | 3.2 | 42 | 1.2 | 2.6 | 0.87 | 15.3 | 684 |
| Comp. Ex. 6 | 20.3 | 18.7 | 5.3 | 9.0 | 54 | 1.1 | 2.4 | 0.75 | 15.1 | 677 |

The balance of composition is Fe and unavoidable impurities

As shown in Table 1, from the powder of each Example, the magnetic member having a high frequency of FR can be obtained. From these evaluation results, superiority of the present invention is apparent.

The powder according to the present invention is suitable for various magnetic members.

The invention claimed is:

1. A powder for a magnetic member, composed of a plurality of flaky particles, the flaky particles being composed of an Fe-based alloy comprising:

6.5% by mass or more and 32.0% by mass or less of Ni;

6.0% by mass or more and 14.0% by mass or less of Al;

0% by mass or more and 17.0% by mass or less of Co; and

0% by mass or more and 7.0% by mass or less of Cu;

with the balance being Fe and unavoidable impurities;

wherein the powder has an average thickness Tav of 3.0 μm or less and a coercive force iHc of 18 kA/m or more.

2. The powder according to claim 1, having a saturation magnetization Ms of 0.9 T or more.

3. The powder according to claim 1, wherein the Fe-based alloy has a structure resulting from spinodal decomposition.

4. A polymer composition for a magnetic member, comprising a base polymer and a powder dispersed in the base polymer, the powder being composed of a plurality of flaky particles, the flaky particles comprising:

6.5% by mass or more and 32.0% by mass or less of Ni;

6.0% by mass or more and 14.0% by mass or less of Al;

0% by mass or more and 17.0% by mass or less of Co; and

0% by mass or more and 7.0% by mass or less of Cu;

with the balance being Fe and unavoidable impurities wherein the powder has an average thickness Tav of 3.0 μm or less and a coercive force iHc of 18 kA/m or more.

* * * * *